US008612677B1

(12) United States Patent
Motegi

(10) Patent No.: US 8,612,677 B1
(45) Date of Patent: Dec. 17, 2013

(54) MEMORY SYSTEM AND METHOD OF WRITING DATA IN A MEMORY SYSTEM

(71) Applicant: Yasuo Motegi, Tokyo (JP)

(72) Inventor: Yasuo Motegi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/671,328

(22) Filed: Nov. 7, 2012

(30) Foreign Application Priority Data

Jul. 26, 2012 (JP) ................................ 2012-166059

(51) Int. Cl.
*G06F 12/00* (2006.01)
*G11B 7/28* (2006.01)

(52) U.S. Cl.
USPC ........................... 711/113; 369/85; 369/53.42

(58) Field of Classification Search
None
See application file for complete search history.

(56) References Cited

U.S. PATENT DOCUMENTS

| | | | | |
|---|---|---|---|---|
| 5,162,851 | A * | 11/1992 | Asakawa et al. | 399/208 |
| 6,233,190 | B1 * | 5/2001 | Cooper et al. | 365/212 |
| 7,222,052 | B2 * | 5/2007 | Coulson et al. | 702/186 |
| 7,233,880 | B2 | 6/2007 | Coulson et al. | |
| 7,450,334 | B1 * | 11/2008 | Wang et al. | 360/75 |
| 7,953,925 | B2 * | 5/2011 | Morris | 711/112 |
| 7,987,317 | B2 * | 7/2011 | Akiba | 711/112 |
| 8,209,504 | B2 * | 6/2012 | Nakanishi et al. | 711/156 |
| 8,370,615 | B2 * | 2/2013 | Chiu | 713/2 |
| 2003/0191889 | A1 * | 10/2003 | Forrer, Jr. | 711/112 |
| 2004/0075931 | A1 * | 4/2004 | Kim et al. | 360/66 |
| 2005/0210344 | A1 * | 9/2005 | Matsui | 714/718 |
| 2005/0288902 | A1 * | 12/2005 | Coulson et al. | 702/186 |
| 2006/0122805 | A1 | 6/2006 | Coulson et al. | |
| 2007/0033433 | A1 * | 2/2007 | Pecone et al. | 714/6 |
| 2007/0067575 | A1 * | 3/2007 | Morris et al. | 711/133 |
| 2007/0106860 | A1 * | 5/2007 | Foster et al. | 711/170 |
| 2007/0140030 | A1 * | 6/2007 | Wyatt | 365/212 |
| 2010/0259998 | A1 * | 10/2010 | Kwon et al. | 365/189.05 |
| 2011/0219203 | A1 * | 9/2011 | Nurminen et al. | 711/165 |
| 2011/0302353 | A1 * | 12/2011 | Confalonieri et al. | 711/103 |

FOREIGN PATENT DOCUMENTS

| | | |
|---|---|---|
| JP | 11-020576 | 1/1999 |
| JP | 2000-011670 | 1/2000 |
| JP | 2007-505406 | 3/2007 |
| JP | 2007-193865 | 8/2007 |
| WO | 2005/026965 | 3/2005 |

* cited by examiner

*Primary Examiner* — Peter Vincent Agustin
(74) *Attorney, Agent, or Firm* — Patterson & Sheridan, LLP

(57) ABSTRACT

A memory system according to an embodiment of the present invention includes a disk recording medium, a non-volatile memory, a temperature measurement module that measures a temperature of the vicinity of the non-volatile memory, a threshold temperature memory module that holds a threshold temperature. The memory system according to the embodiment further includes a controller that writes data in the non-volatile memory if the temperature measured by the temperature measurement module is higher than the threshold temperature upon receiving an instruction to write the data from a host.

14 Claims, 6 Drawing Sheets

FIG.7

| TEMPERATURE | WEIGHTING COEFFICIENT ($\alpha$) |
|---|---|
| NOT MORE THAN T0 | 3 |
| T0 TO T1 | 2 |
| T1 TO T2 | 1 |
| NOT LESS THAN T2 | 0.5 |

# MEMORY SYSTEM AND METHOD OF WRITING DATA IN A MEMORY SYSTEM

CROSS-REFERENCE TO RELATED APPLICATIONS

This application is based upon and claims the benefit of priority from Japanese Patent Application No. 2012-166059, filed on Jul. 26, 2012; the entire contents of which are incorporated herein by reference.

FIELD

Embodiments of the present invention relate to a memory system and a method of writing data in the memory system.

BACKGROUND

For example, there is disclosed a technology to determine whether a non-volatile memory is likely to generate an error based on obtained status information indicating a state of the non-volatile memory such as the number of rewritings and the number of erasures, with respect to an information recording device including a disk-shaped recording medium and a non-volatile memory. In addition, there is disclosed a technology to determine whether the temperature of a non-volatile memory is in a predetermined range upon writing data in the non-volatile memory and to prohibit writing if the temperature is beyond the predetermined range.

A system in consideration of temperature dependency of writing deterioration of a non-volatile memory has been sought in a hybrid memory system in which a non-volatile memory and another memory medium are combined.

BRIEF DESCRIPTION OF THE DRAWINGS

FIG. 7 is a table showing weighting coefficients (α) for respective temperature ranges according to the third embodiment.

DETAILED DESCRIPTION

A memory system according to an embodiment of the present invention includes a disk recording medium, a non-volatile memory, a temperature measurement module configured to measure a temperature of the vicinity of the non-volatile memory, a threshold temperature memory module configured to hold a threshold temperature. The memory system according to the embodiment further includes a controller configured to write data in the non-volatile memory if the temperature measured by the temperature measurement module is higher than the threshold temperature upon receiving an instruction to write the data from a host.

Hereinafter, a memory system and a method of writing data in the memory system according to embodiments will be described in detail with reference to the accompanying drawings. However, the present invention is not limited to these embodiments.

First Embodiment

A memory system according to this embodiment is, for example, a hybrid drive including a magnetic disk and a non-volatile memory. In a hybrid drive, a non-volatile memory is used as, for example, a write cache. That is, data from a host is once written in the non-volatile memory used as a cache memory. After that, the data is written in an HDD.

Figure 1:
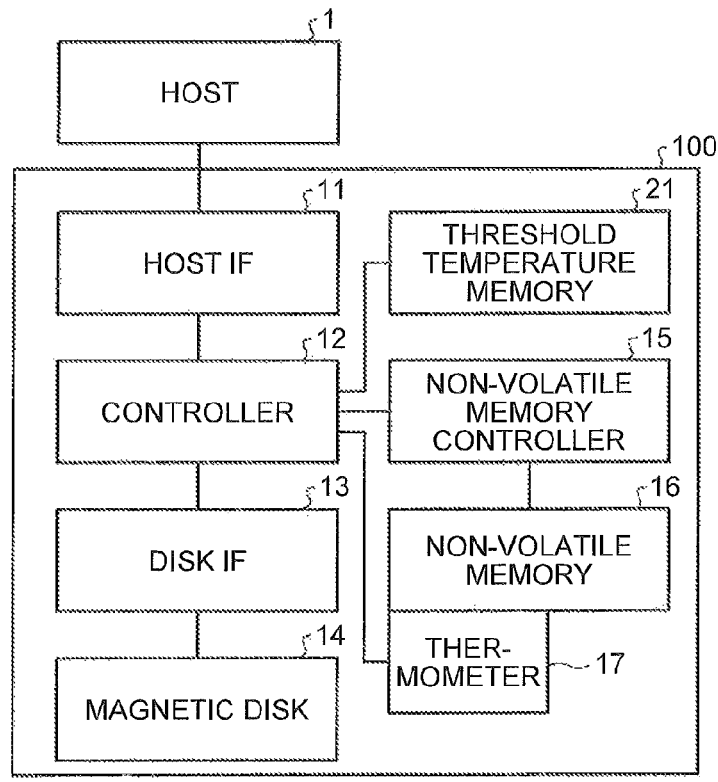
FIG. 1 is a block diagram illustrating a configuration of a memory system according to a first embodiment.

FIG. 1 is a block diagram illustrating a configuration of a memory system 100 according to a first embodiment. The memory system 100 includes a host interface (IF) 11, a controller 12, a disk interface (IF) 13, a magnetic disk 14 (disk-shaped recording medium), a non-volatile memory controller 15, a non-volatile memory 16, a thermometer 17 (temperature measurement module), and a threshold temperature memory 21. The memory system 100 is connected to a host (device) 1 via the host interface (IF) 11. The controller 12 controls the magnetic disk 14 via the disk interface (IF) 13, and the non-volatile memory controller 15 controls the non-volatile memory 16. The thermometer 17 is preferably provided near the non-volatile memory 16, so that the thermometer 17 can measure the temperature of the non-volatile memory 16 or its vicinity. The threshold temperature memory 21 is a memory that holds a predetermined threshold temperature described later, and may be a RAM or a non-volatile memory or may be a part of the magnetic disk 14 or the non-volatile memory 16 or the like.

Figure 2:
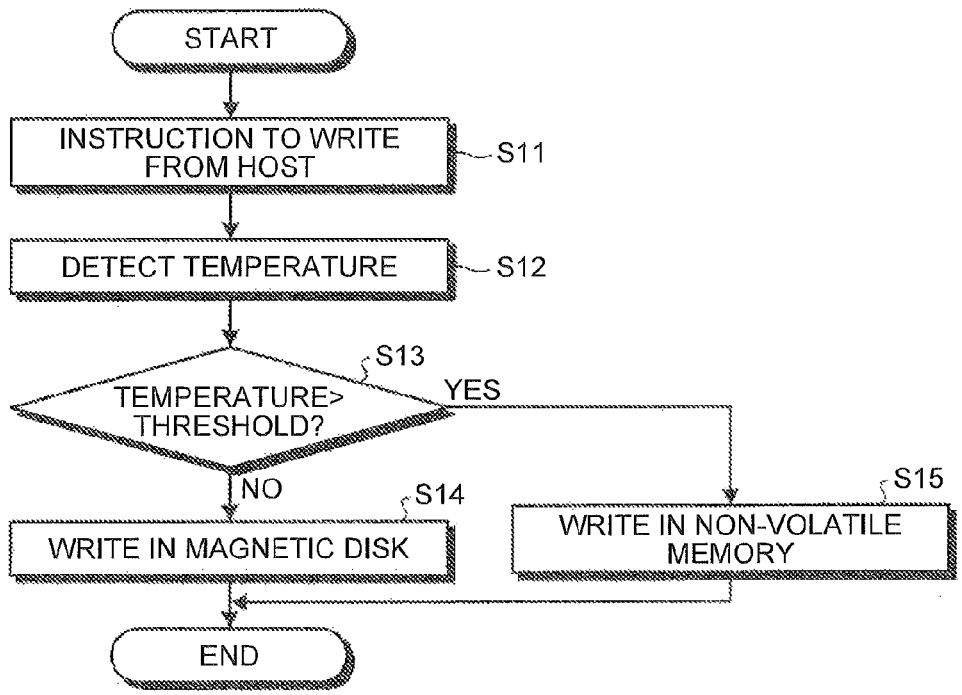
FIG. 2 is a flowchart showing a method of writing data in the memory system according to the first embodiment.

Operation of the memory system 100 will be described with reference to FIG. 1 and the flowchart of FIG. 2. First, an instruction to write given by the host 1 is received by the controller 12 (Step S11). The controller 12 detects the temperature of the non-volatile memory 16 upon writing data from the thermometer 17 (Step S12), and determines in which of the non-volatile memory 16 and the magnetic disk 14 to write the data (Step S13). That is, if the temperature indicated by the thermometer 17 is not more than the predetermined threshold temperature held by the threshold temperature memory 21 (Step S13: No) when the host 1 gives the instruction to write, the data is written in the magnetic disk 14 (Step S14). If the temperature is not less than the threshold temperature (Step S13: Yes), the data is written in the non-volatile memory 16 (Step S15). Accordingly, writing in the non-volatile memory 16 at a low temperature can be avoided, and it is possible to minimize deterioration of the non-volatile memory 16 and achieve a longer service life.

Second Embodiment

Figure 3:
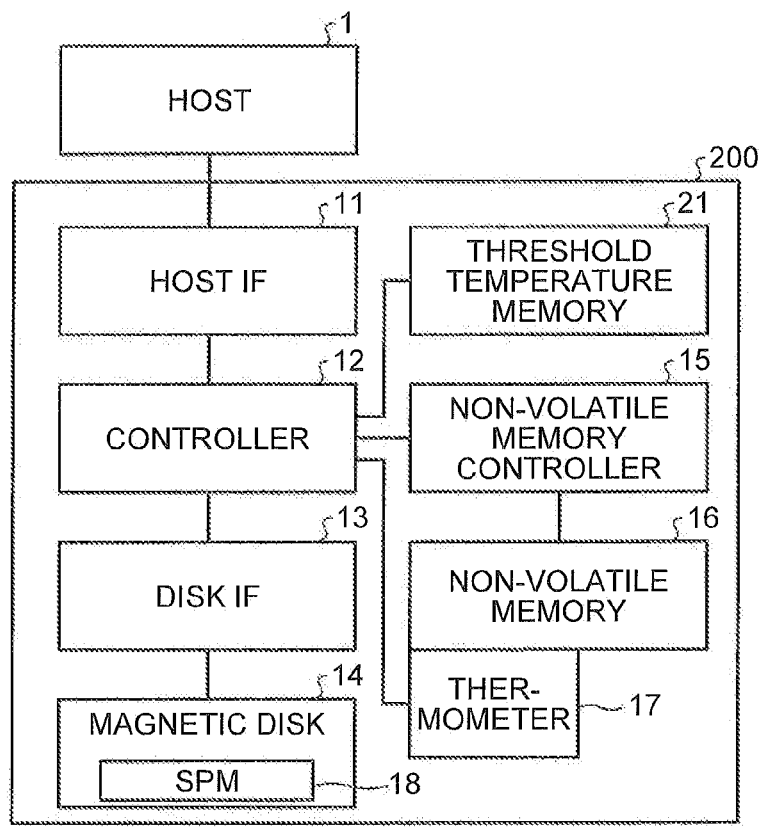
FIG. 3 is a block diagram illustrating a configuration of a memory system according to a second embodiment.
Figure 4:
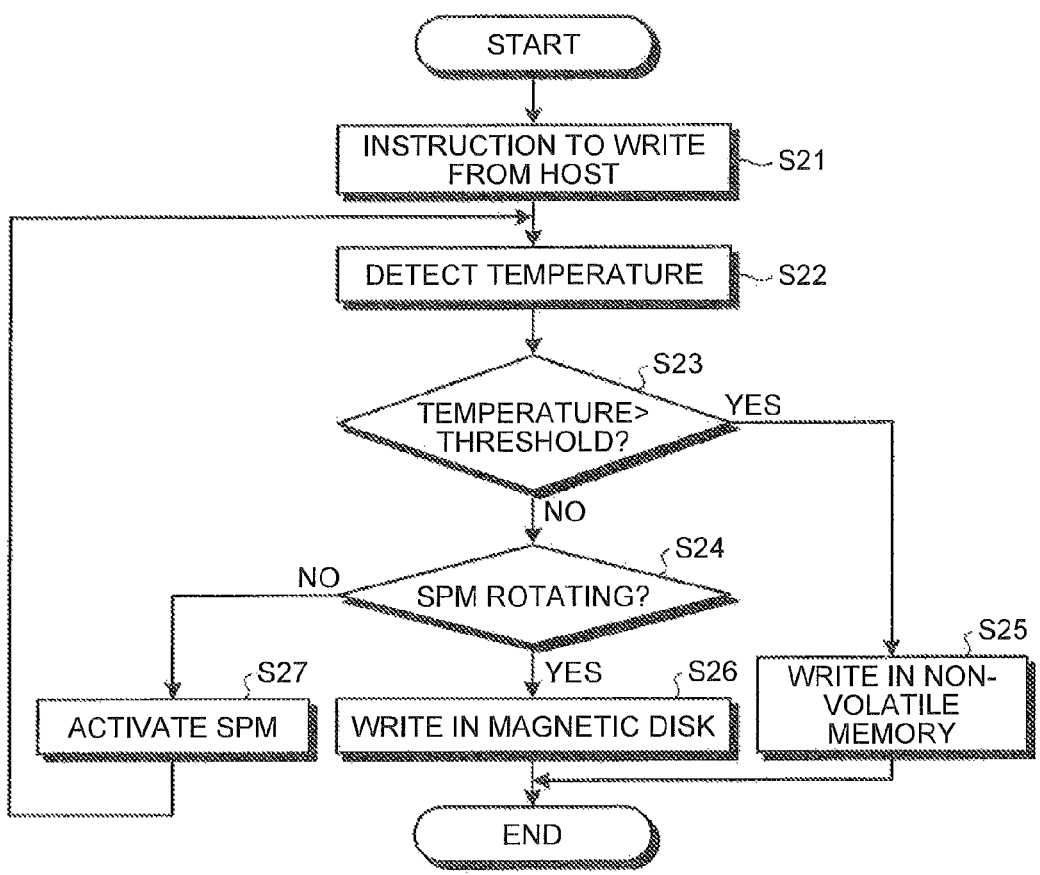
FIG. 4 is a flowchart showing a method of writing data in the memory system according to the second embodiment.

FIG. 3 is a block diagram illustrating a configuration of a memory system 200 according to a second embodiment, FIG. 3 illustrates a configuration in which a spindle motor (SPM) 18 is added to the configuration illustrated in FIG. 1. Operation of the memory system 200 according to the second embodiment will be described with reference to FIG. 3 and the flowchart of FIG. 4. In the memory system 200 according to this embodiment, the magnetic disk 14 is located near the non-volatile memory 16. The steps S21, S22, S23, and S25 according to this embodiment shown in FIG. 4 are similar to the steps S11, S12, S13, and S15 according to the first embodiment shown in FIG. 2.

Differences from the first embodiment will be described. In this embodiment, if the temperature is not more than the threshold temperature in the step S23, (Step S23: No), it is determined whether the spindle motor (SPM) 18 included in the magnetic disk 14 is rotating or not (Step S24). If the spindle motor (SPM) 18 is rotating (Step S24: Yes), data is written in the magnetic disk 14 (Step S26). If the spindle motor (SPM) 18 is not rotating (Step S24: No), the spindle motor (SPM) 18 is activated (Step S27). Accordingly, the temperature of the magnetic disk device increases. As a result, the temperature around the non-volatile memory 16 provided near the magnetic disk 14 may increase. This temperature increase can be detected by the thermometer 17. The process proceeds again to the steps S22 and S23 after the spindle motor (SPM) 18 is activated, and accordingly, it is possible to write the data in the non-volatile memory 16 (Step S25) if the temperature indicated by the thermometer 17 is equal to or more than the predetermined threshold temperature (Step S23: Yes). Accordingly, high-speed writing becomes possible while minimizing deterioration of the non-volatile memory 16 even in a low temperature environment. Note that, if the temperature is not more than the predetermined threshold temperature (Step S23: No), the spindle motor (SPM) 18 is already activated (Step S24: Yes). Accordingly, the data is written in the magnetic disk 14 (Step S26).

Third Embodiment

Figure 5:
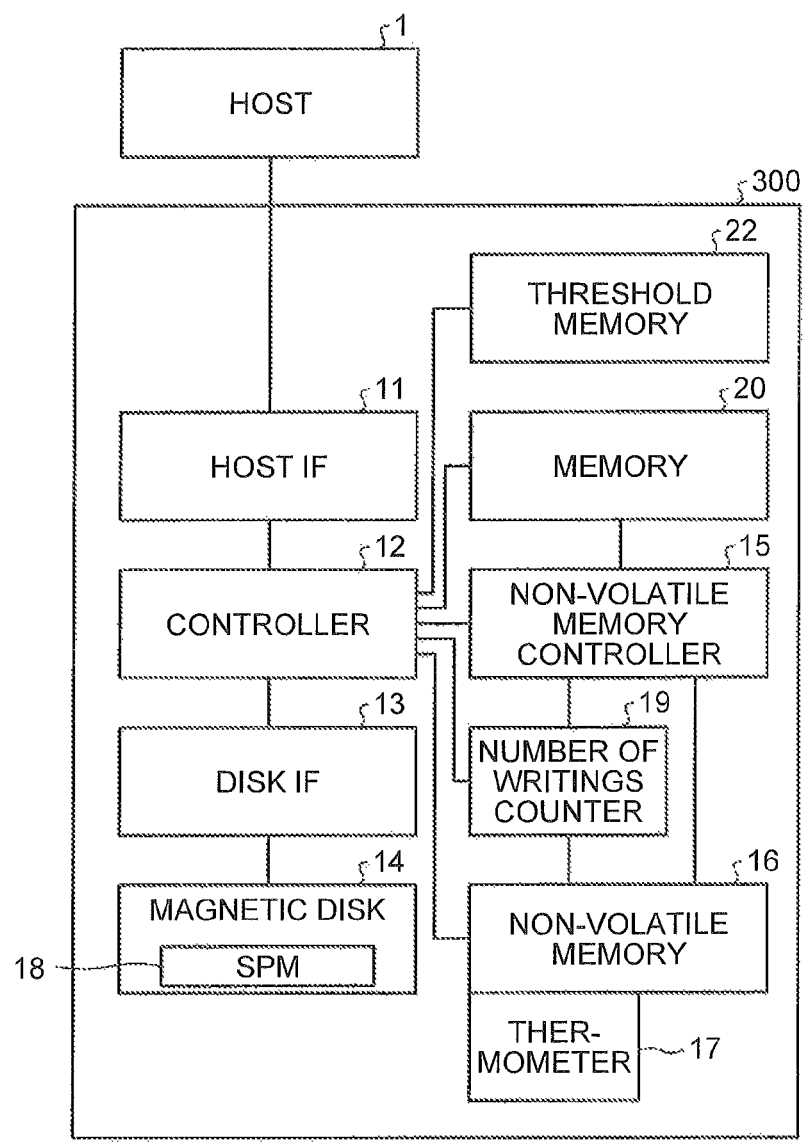
FIG. 5 is a block diagram illustrating a configuration of a memory system according to a third embodiment.

FIG. 5 is a block diagram illustrating a configuration of a memory system 300 according to a third embodiment. The memory system 300 includes the host interface (IF) 11, the controller 12, the disk interface (IF) 13, the magnetic disk 14, the non-volatile memory controller 15, the non-volatile memory 16, the thermometer 17 (temperature measurement module), a number of writings counter 19, a threshold memory 22, and a memory 20. Components different from FIG. 1 will be described below. The number of writings counter 19 is a counter that counts the number of writings in the non-volatile memory 16, and may be a RAM that temporarily stores a count value held by the non-volatile memory 16 or a non-volatile memory, or may be a part of the non-volatile memory 16 or the like. In the number of writings counter 19, a value of the counter will be added every time data is written in the non-volatile memory 16 as described later. The memory 20 is a memory module that temporarily stores information on a table of weighting coefficients held by the magnetic disk 14 or the non-volatile memory 16, and may be a RAM or a non-volatile memory, or may be a part of the magnetic disk 14 or the non-volatile memory 16 or the like. The threshold memory 22 is a memory module that holds a predetermined threshold to be compared with a value of the number of writings counter 19, and may be a RAM or a non-volatile memory, or may be a part of the non-volatile memory 16 or the like. Note that, this threshold is a value that is preliminarily determined by a life test on the non-volatile memory 16 or the like.

Figure 6:
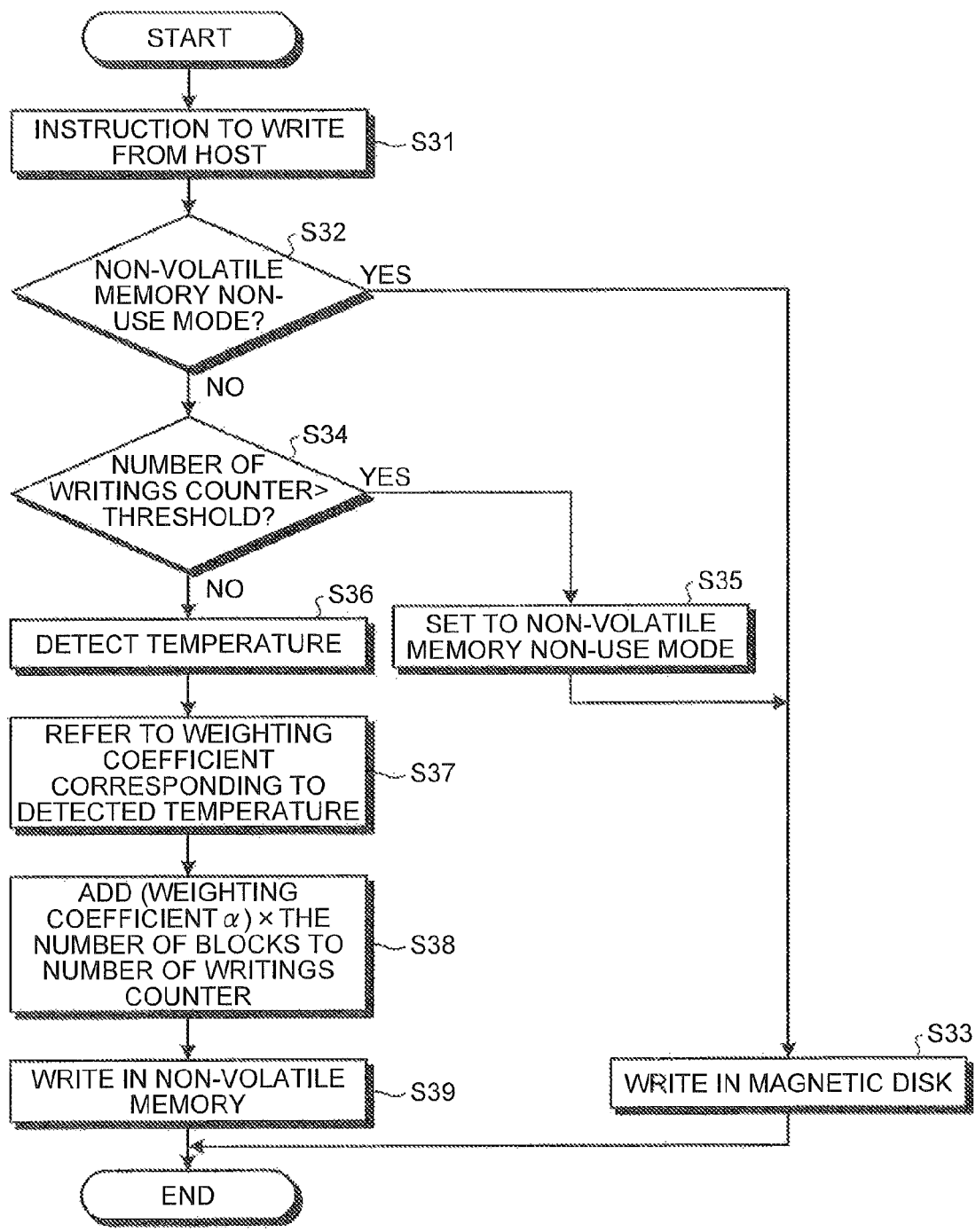
FIG. 6 is a flowchart showing a method of writing data in the memory system according to the third embodiment.

Operation of the memory system 300 according to the third embodiment will be described with reference to FIG. 5 and the flowchart of FIG. 6. First, when the controller 12 receives an instruction to write from the host 1 (Step S31), it is determined whether the mode is "non-volatile memory non-use mode" (Step S32). The non-volatile memory 16 has a limitation on the number of rewritings. Therefore, the memory system 300 according to this embodiment has "non-volatile memory non-use mode" in which data is directly written in the magnetic disk 14 without using the non-volatile memory 16 when it is assumed that the predetermined number of rewritings in the non-volatile memory 16 is reached. Accordingly, when the mode is "non-volatile memory non-use mode" (Step S32: Yes), the data is written in the magnetic disk 14 (Step S33).

When the mode is not "non-volatile memory non-use mode" (Step S32: No), the value of the number of writings counter 19 is checked to determine whether the value exceeds the predetermined threshold held by the threshold memory 22 (Step S34). If the value of the counter exceeds the threshold (Step S34: Yes), the mode is switched to "non-volatile memory non-use mode" in which the data is directly written in the magnetic disk 14 in response to an instruction to write data given by the host 1 (Step S35), and the data is written in the magnetic disk 14 (Step S33).

If the value of the number of writings counter does not exceed the threshold (Step S34: No), the temperature indicated by the thermometer 17 is detected (Step S36), and a weighting coefficient ($\alpha$) corresponding to the detected temperature is referred to from the table shown in FIG. 7 (Step S37). FIG. 7 is a table showing weighting coefficients ($\alpha$) for respective temperature ranges and the table is held by the memory 20 in the memory system 300. Weighting coefficients ($\alpha$) in the table of FIG. 7 become larger as the temperature decreases, reflecting the fact that deterioration of the non-volatile memory 16 is more accelerated as the temperature upon writing data in the non-volatile memory 16 becomes lower. Then, "$\alpha \times$the number of blocks in which data is written" is added to the number of writings counter 19 by using the weighting coefficient ($\alpha$) corresponding to the measured temperature (Step S38) to be written in the non-volatile memory 16 (Step S39). That is, in this embodiment, depending on the temperature upon writing data in the non-volatile memory 16, weighting of the value added to the number of writings counter 19 is changed. Accordingly, accuracy of predicting expiration of a rewriting service life of the non-volatile memory 16 is improved, and it is possible to reduce occurrence of a data read error by prohibiting the writing before the service life of the non-volatile memory 16 expires while executing the writing until a service limit of the non-volatile memory 16.

In addition, in combination with the first embodiment, a branch to write data in the magnetic disk 14 (Step S33) if the temperature is not more than the predetermined threshold temperature upon checking the temperature in the step S36 may be provided. Furthermore, in combination with the second embodiment, whether the spindle motor (SPM) 18 is rotating or not may be determined if the temperature is not more than the predetermined threshold temperature upon checking the temperature in the step S36, and the temperature checking of the step S36 may be carried out again after the spindle motor (SPM) 18 is activated if the spindle motor (SPM) 18 is not rotating. In the above embodiments, a hybrid drive including a magnetic disk and a non-volatile memory was explained as an example; however, a memory system including other devices such as a magnetic dick device (HDD device) and an SSD (Solid State Drive) may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a disk recording medium;
   a non-volatile memory;
   a temperature measurement module configured to measure a temperature in the vicinity of the non-volatile memory;
   a threshold temperature memory module configured to hold a threshold temperature value; and
   a controller configured to write data in the non-volatile memory if, upon receiving an instruction to write the data from a host, the temperature measured by the temperature measurement module is higher than the threshold temperature value, and to write data in the non-volatile memory if, upon receiving an instruction to write the data from a host, the temperature measured by the temperature measurement module is not higher than the threshold temperature value.

2. The memory system of claim 1,
   wherein the disk recording medium is disposed near the non-volatile memory, and
   wherein the controller is configured to cause a motor for rotating the disk recording medium to begin rotating if the temperature measured by the temperature measurement module is lower than the threshold temperature value.

3. The memory system of claim 2, wherein the controller is configured to check the temperature measured by the temperature measurement module after causing the motor to begin rotating and prior to writing the data, and if the temperature measured by the temperature measurement module is higher than the threshold temperature value, write the data in the non-volatile memory.

4. The memory system of claim 1, further comprising:
   a number of writings counter configured to hold a value related to the number of writings in the non-volatile memory; and
   a memory module configured to hold a weighting coefficient corresponding to a temperature at which data in the non-volatile memory are written,
   wherein the controller adds to the number of writings counter a value based on the weighting coefficient corresponding to the temperature measured by the temperature measurement module and, upon receiving an instruction to write the data from the host, writes the data in the non-volatile memory if the temperature measured by the temperature measurement module is higher than the threshold temperature value, wherein the controller does not write the data in the non-volatile memory if a value of the number of writings counter exceeds a predetermined value.

5. The memory system of claim 4, wherein the weighting coefficient remains the same or decreases in value as the temperature decreases.

6. The memory system of claim 4, wherein the value based on the weighting coefficient is a value obtained by multiplying a number of blocks in which the data are written by the weighting coefficient.

7. The memory system of claim 1, wherein the non-volatile memory is a cache memory for the disk recording medium.

8. A method of writing data in a memory system comprising a disk recording medium, a non-volatile memory, a temperature measurement module configured to measure a temperature in the vicinity of the non-volatile memory, and a threshold temperature memory module configured to hold a threshold temperature value,
   the method comprising:
   writing data in the non-volatile memory if, upon receiving an instruction to write the data from a host, the temperature measured by the temperature measurement module is higher than the threshold temperature value; and
   writing data on the disk recording medium if, upon receiving an instruction to write the data from a host, the temperature measured by the temperature measurement module is not higher than the threshold temperature value.

9. The method of claim 8,
   wherein the disk recording medium is disposed near the non-volatile memory in the memory system,
   the method comprising:
   causing a motor for rotating the disk recording medium to begin rotating if the temperature measured by the temperature measurement module is lower than the threshold temperature value, and
   after causing the motor to begin rotating, checking the temperature measured by the temperature measurement module and, if the temperature measured by the temperature measurement module is higher than the threshold temperature value, writing the data in the non-volatile memory.

10. The method of claim 8,
    wherein the memory system further comprises a number of writings counter configured to hold a value related to the number of writings in the non-volatile memory and a memory module configured to hold a weighting coefficient corresponding to a temperature at which data in the non-volatile memory are written,
    the method further comprising:
    adding to the number of writings counter a value based on the weighting coefficient corresponding to the temperature measured by the temperature measurement module and, upon receiving an instruction to write the data from the host, writing the data in the non-volatile memory if the temperature measured by the temperature measurement module is higher than the threshold temperature value.

11. The method of claim 10,
    wherein the data are not written in the non-volatile memory if a value of the number of writings counter exceeds a predetermined value.

12. The method of claim 10, wherein the weighting coefficient remains the same or decreases in value as the temperature decreases.

13. The method of claim 10, wherein the value based on the weighting coefficient is a value obtained by multiplying a number of blocks in which the data are written by the weighting coefficient.

14. The method of claim 8, wherein the non-volatile memory is a cache memory for the disk recording medium.

* * * * *